United States Patent [19]

Dolza, Sr.

[11] 3,926,158

[45] Dec. 16, 1975

[54] SEGREGATED LEAN-RICH FED SPARK IGNITION ENGINE

[76] Inventor: John Dolza, Sr., 810 State St., Fenton, Mich. 48430

[22] Filed: Jan. 2, 1974

[21] Appl. No.: 430,367

[52] U.S. Cl. .......... 123/75 B; 123/32 K; 123/32 ST; 123/127; 123/191 S
[51] Int. Cl.² ......................................... F02B 19/10
[58] Field of Search ......... 123/191 S, 191 SP, 32 C, 123/75 B, 32 SP, 32 SPA, 32 D, 32 K, 32 ST

[56] References Cited
UNITED STATES PATENTS

| | | | |
|---|---|---|---|
| 1,434,448 | 11/1922 | Mowbray | 123/75 B |
| 2,242,990 | 5/1941 | Brown | 123/75 B |
| 2,799,257 | 7/1957 | Stumpfig et al. | 123/34 |
| 3,182,645 | 5/1965 | Wilson | 123/75 X |
| 3,283,751 | 11/1966 | Goossak et al. | 123/119 R X |
| 3,304,922 | 2/1967 | Hideg | 123/127 X |
| 3,382,850 | 5/1968 | Baudry et al. | 123/75 X |

FOREIGN PATENTS OR APPLICATIONS

| | | | |
|---|---|---|---|
| 571,678 | 3/1959 | Canada | 123/32.9 |
| 1,186,492 | 8/1959 | France | 123/32.9 |

Primary Examiner—Wendell E. Burns
Assistant Examiner—David D. Reynolds
Attorney, Agent, or Firm—Reising, Ethington, Barnard, Perry & Brooks

[57] ABSTRACT

A V-type engine has a central injection type carburetor feeding spark ignitable fuel mixture downwardly and air upwardly into longitudinally partitioned intake manifold pipes radiating outwardly to the respective engine cylinders. Adjacent the intake valve in each cylinder is a segregation chamber extending upwardly from the combustion chamber in a direction generally longitudinally of the cylinder and having the spark plug in its extended end. A deflector member directs the ignitable mixture into the segregation chamber during the piston suction stroke, and a deflecting ridge on the piston serves to retain a relatively rich fuel and air mixture on the segregation chamber side of the cylinder. The segregation chamber may have a liner which operates at higher temperature than the cylinder head to increase the mixture temperature therein for facilitating ignition.

20 Claims, 14 Drawing Figures

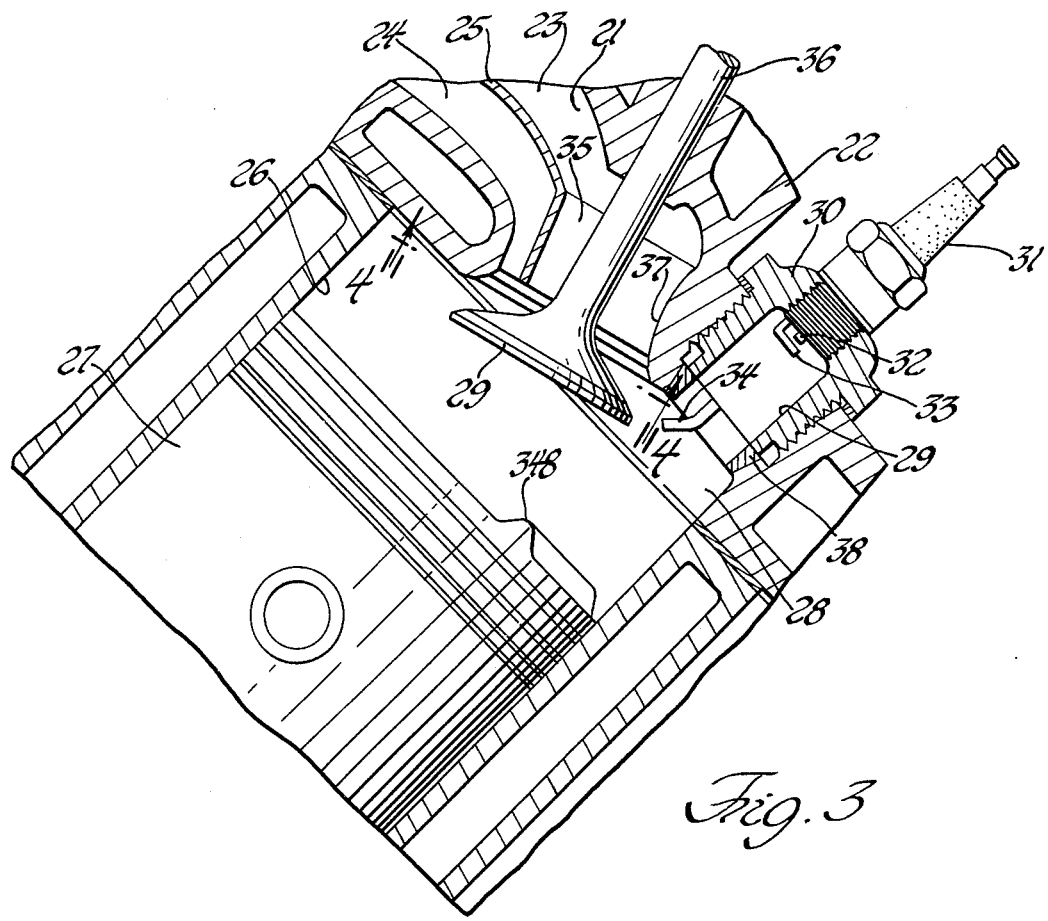
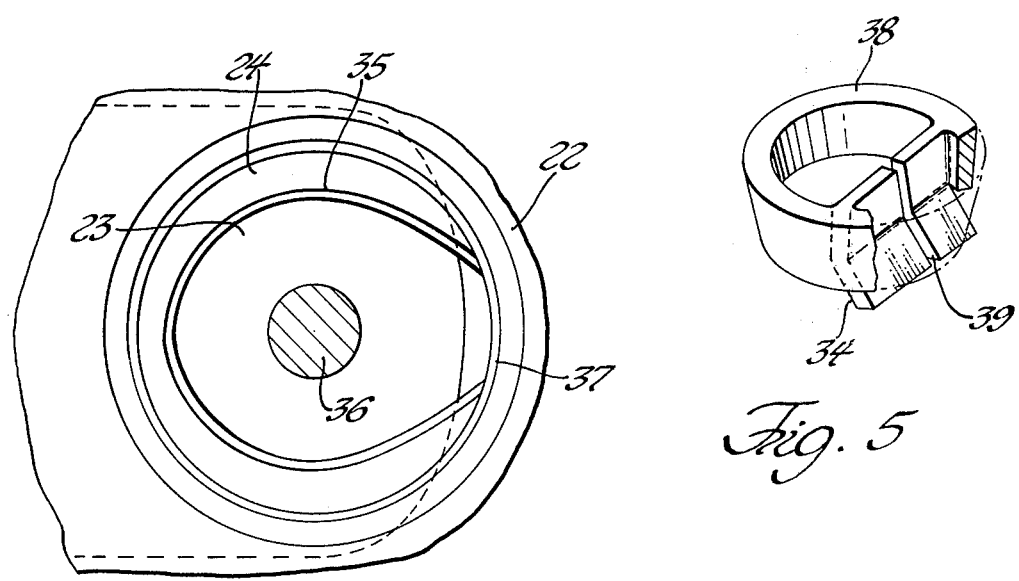
Fig. 3
Fig. 4
Fig. 5

SEGREGATED LEAN-RICH FED SPARK IGNITION ENGINE

SUMMARY AND BACKGROUND OF THE INVENTION

This invention relates to spark ignition internal combustion engines of the segregated charge type.

Minimizing the amount of carbon monoxide and hydrocarbons, as well as nitrous oxides, in the exhaust of automotive engines is today an industry-wide goal. As might be expected, most of the effort toward achieving the same has gone in the direction of attempting to retain use of conventional engine structure, including the more or less standard combustion chamber, with only modifications in carburetion and ignition and the adding on of catalytic and other after-burner devices. General agreement is believed to exist, however, that to accomplish the desired objective within the engine itself, i.e., without the add-on devices, requires both efficient combustion by obtaining as near as possible complete burning of the fuel charge in the cylinder, and that such combustion be carried out at a low enough temperature to prevent formation of nitrous oxides.

In the segregated charge engine a fuel and air mixture rich enough to be readily spark ignitable is delivered separately, i.e., unmixed with the additional air required for complete combustion, to the vicinity of the spark plug and held there until ignited. Its ignition produces a torch like flame of sufficient temperature to ignite the adjacent but much leaner fuel and air mixture portion of the charge, with the result that the burning of the total quantity of the fuel introduced is carried out more completely and at a lower temperature than is possible in the conventional engine which receives its charge in the form of a more or less homogenous mixture of fuel and air. For these reasons the segregated charge engine has been receiving increasing attention of late, with the only two serious objections voiced against it being the cost of tooling changes involved in providing the charge segregation chamber, and the greater difficulty of assuring ignition dependability under all engine operating conditions.

The segregated charge engine of my invention substantially simplifies the provision for the segregation chamber by arranging it to extend upwardly from the main combustion chamber in a direction generally longitudinally of the cylinder. Being located adjacent the intake valve, the segregation chamber may thus be formed as an extension and enlargement of the hole normally provided for mounting the spark plug in the standard production engine. Except for being elevated to the outer end of this segregation chamber the spark plug location is practically unchanged, and hence very little alteration is required of the tooling from that used heretofore.

The intake manifold and inlet passage leading to the cylinder may be partitioned to provide separate passage sectors for the flow of the spark ignitable mixture and air or other lean mixture of fuel and air, and the partitioning of the inlet passage, coupled with a deflector member, thus assures adequate filling of the segregation chamber with spark ignitable mixture during the suction stroke. Also, a deflecting ridge on the piston may be added which serves during the compression stroke to redirect such mixture into the segregation chamber.

The deflector member extends into the main combustion chamber and toward the intake valve from the entrance to the segregation chamber, with the result that it heats up more quickly during engine warm up and also remains at a higher operating temperature than the adjacent surfaces of the combustion chamber. As a consequence, the spark ignitable mixture flowing into the segregation chamber receives heat from the deflector member, aiding and assuring ignition thereof even under minimum throttle conditions. This heating of the mixture within the segregation chamber may be augmented in accordance with my invention by forming the deflector member as an integral part of a ring which is inserted as a liner into the combustion chamber end of the segregation chamber, the material of such ring being of higher thermal conductivity than the cylinder head and resistant at high temperatures to sulphur and lead poisoning. Additionally, all the internal surfaces of the segregation chamber may be defined by one or more insert parts of such material which is resistant to degradation at high operating temperatures, and such inserts may be provided with an initial clearance fit with the surrounding metal of the cylinder head so as to delay their heat transfer to the cylinder head pending thermal expansion of the inserts radially outward against the surrounding surfaces of the head during engine warm-up.

While segregated charge engines are broadly old in the art, as represented by U.S. Pat. Nos. 2,098,875 Mallory; 2,242,990 Brown; 2,466,181 Myrick; 2,884,913, 2,983,268 and 3,113,561 Heintz; 3,092,088 and 3,283,751 Goossak et al., and 3,230,939 Goossak, none of them has the structural features necessary to accomplish the advantages of production economy and ignition dependability obtained by my invention. The two first referred to Heintz patents have the segregation chamber extending upwardly from the main combustion chamber, as does the Myrick patent which also includes partitioning of the inlet passage, but Heintz requires a separate valve inlet to the segregation chamber, and Myrick relies on centrifugal swirl of the surrounding air or lean mixture portion of the charge within the main combustion chamber to stratify and induce the spark ignitable mixture to enter the segregation chamber. Also, in none of the prior art disclosures of which I am aware is there provision made for elevating the temperature of the spark ignitable mixture within the segregation chamber relative to that of the combustion supporting air and leaner mixture portions of the charge.

My invention accomplishes both a positive filling and scavenging of the segregation chamber together with sufficient heating of the spark ignitable mixture therein to insure its ignition by the spark plug under all engine operating conditions. These advantages are obtained by a novel structural arrangement which minimizes tooling costs necessary to convert thereto from engine designs currently being produced in high volume by the automotive industry.

The means by which these and other objects and advantages of the invention are obtained will be more clearly appreciated from the following description of its various embodiments, having reference to the drawings, wherein:

BRIEF DESCRIPTION OF DRAWINGS

FIG. 3 is an enlarged fragmentary vertical sectional view of one power cylinder of the engine taken in a plane bisecting both the inlet port and the segregation chamber.

FIG. 4 is a fragmentary elevational view looking in the direction of arrows 4—4 of FIG. 3, with parts broken away and in section.

FIG. 5 is a perspective view of an integral ring and deflector element shown removed from the entrance to the segregation chamber of the engine.

Figure 1:
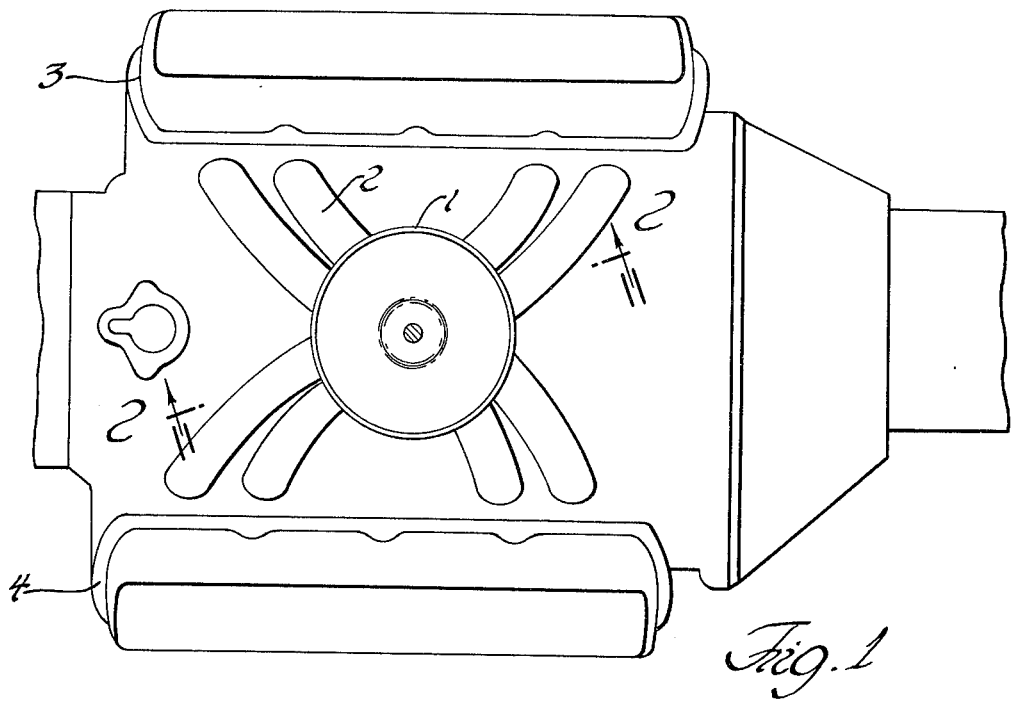
FIG. 1 is a top plan view of a V-8 automotive engine such as might embody the invention.
Figure 2:
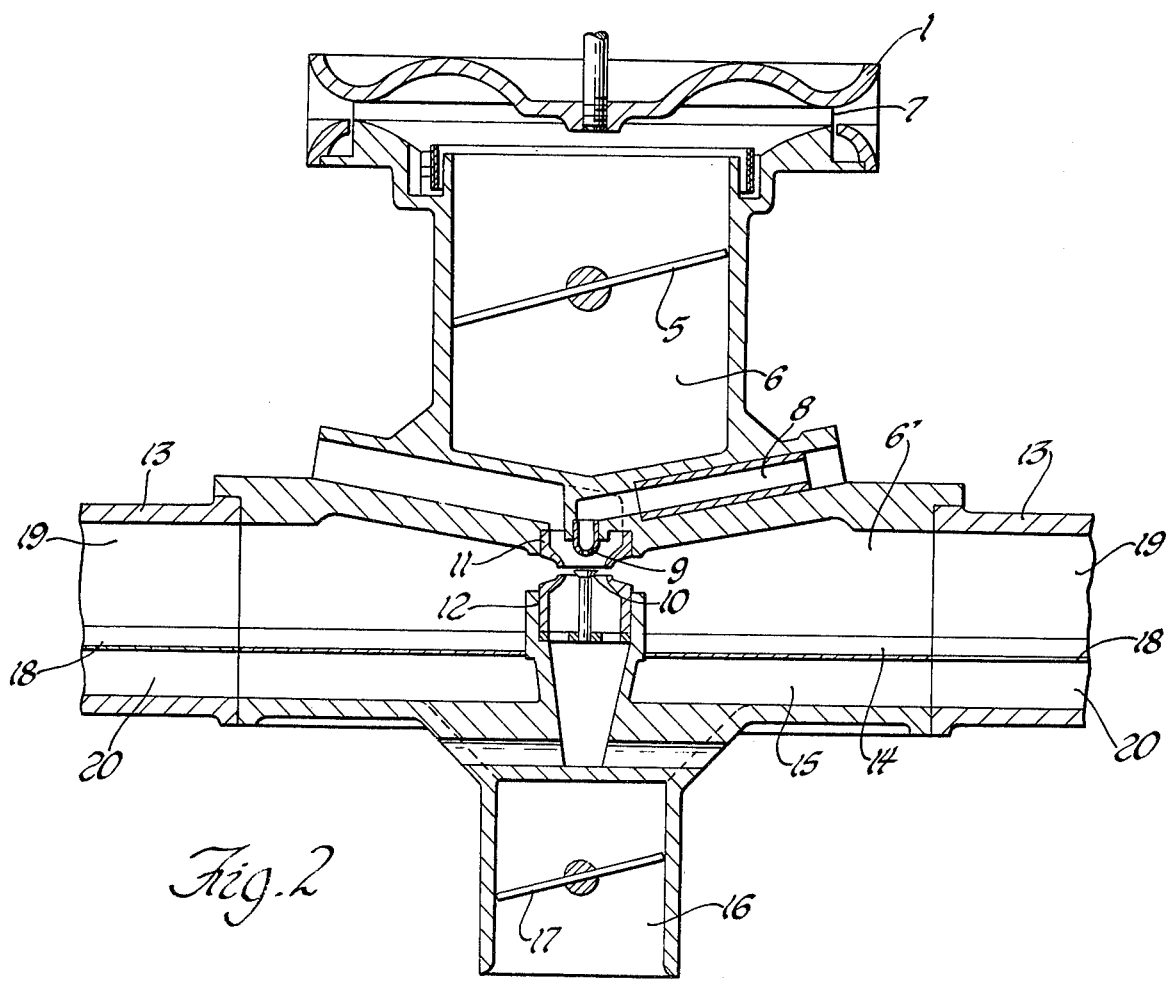
FIG. 2 is an enlarged fragmentary vertical section taken substantially along the line 2—2 of FIG. 1 and showing certain details of the carburetor and intake manifold.

Referring now in detail to the drawings, the V–8 engine illustrated in FIG. 1 is similar to those produced in very high volume for the automotive vehicle and like market, except for being equipped with an improved injection type carburetor 1 and intake manifold 2 disposed between the two cylinder banks 3 and 4 of the engine. The carburetor, as illustrated in FIG. 2, has an upper butterfly valve 5 controlling air flow through a downdraft passage 6, the air entering radially in all directions into the upper end of the latter through an annular venturi throat 7. At the lower end of the passage 6 is a chamber 6' in which the air mixes with fuel which is fed to a fuel passage 8 from a pump and metering unit (not shown). The fuel thus fed is discharged downwardly through an orifice 9 against an upwardly presenting disk member 10 which redirects the fuel radially outward in all directions in sheet-like form so that it passes between spaced upper and lower bushing-like members 11 and 12 for mixture with the air in the chamber 6' and flow therewith outwardly to the respective intake pipes 13 of the manifold 2. The bottom wall of the chamber 6' is defined by a partition 14 which separates that chamber from a lower chamber 15 into which a supplementary or combustion supporting gaseous fluid, such as air or a lean mixture of air and fuel, enters upwardly through a passage 16 controlled by a lower butterfly valve 17.

The mixture of fuel and air entering the intake manifold from the chamber 6' is sufficiently enriched with fuel to be readily spark ignitable in the engine cylinders and may be kept separate from the other gaseous fluid delivered from the lower chamber 15 by partitioning 18 in each of the intake manifold pipes 2. Thus the manifold partitioning 18, as shown in FIG. 2, forms a continuation of the partitioning 14 between the two chambers 6' and 15 of the carburetor and divides each of the manifold pipes into an upper passage sector 19 for the spark ignitable mixture and a lower passage sector 20 through which the supplementary air or leaner mixture flows to the cylinders.

Referring to FIG. 3 showing one of the engine power cylinders, it will be seen that the inlet passage 21 in the cylinder head 22 is likewise shown separated into upper and lower passage sectors 23 and 24 by partitioning means 25 which constitutes a continuation of the partition 18 in the manifold intake pipe connected to that cylinder. Such partitioning 25 and 18 may be formed as integral parts of the cylinder head and intake manifold, or as prefabricated inserts suitably secured therein. With such partitioning, whatever the details of its construction may be, the upper passage sectors 21 and 19 should preferably have a flow capacity of approximately twice that of the lower air passage sectors 24 and 20.

The power cylinder shown in FIG. 3 includes the engine cylinder 26 fitted with a piston 27, opposite which is the main combustion chamber 28 into which the poppet type intake valve 29 opens during the suction stroke of the piston. Adjacent the intake valve and extending generally upwardly and longitudinally of the cylinder from the combustion chamber 28 is a spark ignitable mixture segregation chamber 29 whose volume is within one-quarter of 1 percent and 4 percent of the volume of the cylinder 26 swept by the piston 27 during each stroke thereof. The segregation chamber, being thus located, may be provided as an enlargement and extension of the opening normally provided for the spark plug in the standard production engine. Threaded into such opening is a bushing-like member 30 whose internal side walls define the lateral extremities of the segregation chamber 29, and threaded into the upper end of this bushing member is the spark plug 31 with its spark generating electrodes 32, 33, located in the upper end of the segregation chamber. To insure that the electrodes are enveloped by spark ignitable mixture when the latter is compressed into the upper end of the segregation chamber during the compression stroke of the piston, the length or depth of the segregation chamber should be from one-eighth to one-half the diameter of the cylinder. Extending into the combustion chamber 28 and toward the intake valve from the entrance to the segregation chamber is a deflector member 34 which operates to direct the spark ignitable mixture into the segregation chamber as such mixture flows into the combustion chamber 28 past the open intake valve from the sector 23 of the inlet passage 21. To assist in channeling such flow of spark ignitable mixture toward the deflector member 34, and thus assure ample filling and scavenging of the segregation chamber with such spark ignitable mixture, the partitioning 25 terminates adjacent its lower end with C-shape shroud portions 35 and 36 (FIG. 4) which extend around the stem 36 of the valve to the sidewall 37 of the intake passage 21 adjacent the segregation chamber. The deflector member 34 extends across the entrance to the segregation chamber and is supported therein, as best shown in FIG. 5, by forming it as an integral part of a ring 38. The ring has conical exterior sidewalls which seat in the cylinder head opening immediately below the spark plug bushing member 30. Both the ring 38 with its deflector member portion 34 and the bushing member 30 are preferably of a material having relatively high thermal conductivity, i.e., substantially higher than the cast iron material of the cylinder head. The material thereof should also have high resistance to sulphur and lead poisoning, i.e., metal degradation through formation of sulphur and lead oxides, etc. Being non-integral with the cylinder head, these inserts will retain a certain amount of the heat of combustion before it can be transmitted to the metal of the head and will thus heat up more quickly and run hotter during engine operation than the surrounding cylinder head material. This feature is further accentuated in the deflector member 34 itself by reason of its relatively thin section and isolation, except at its ends, from the ring 38. Accordingly, both the deflector 34 and the bushing 30 will have higher operating temperatures than the surrounding cylinder head material, and the spark ignitable mixture flowing over the surfaces of these inserts will be elevated in temperature thereby. Such heating of the spark ignitable mixture aids and assures its ignition by the spark plug, and is particularly advantageous during engine warm-up since these inserts increase in temperature much more rapidly than the surrounding metal of the cylinder head. As best shown in FIG. 5, the deflector has a slit or gap 39 to accommodate relative thermal expansion transversely of the supporting ring 38.

Figure 6:
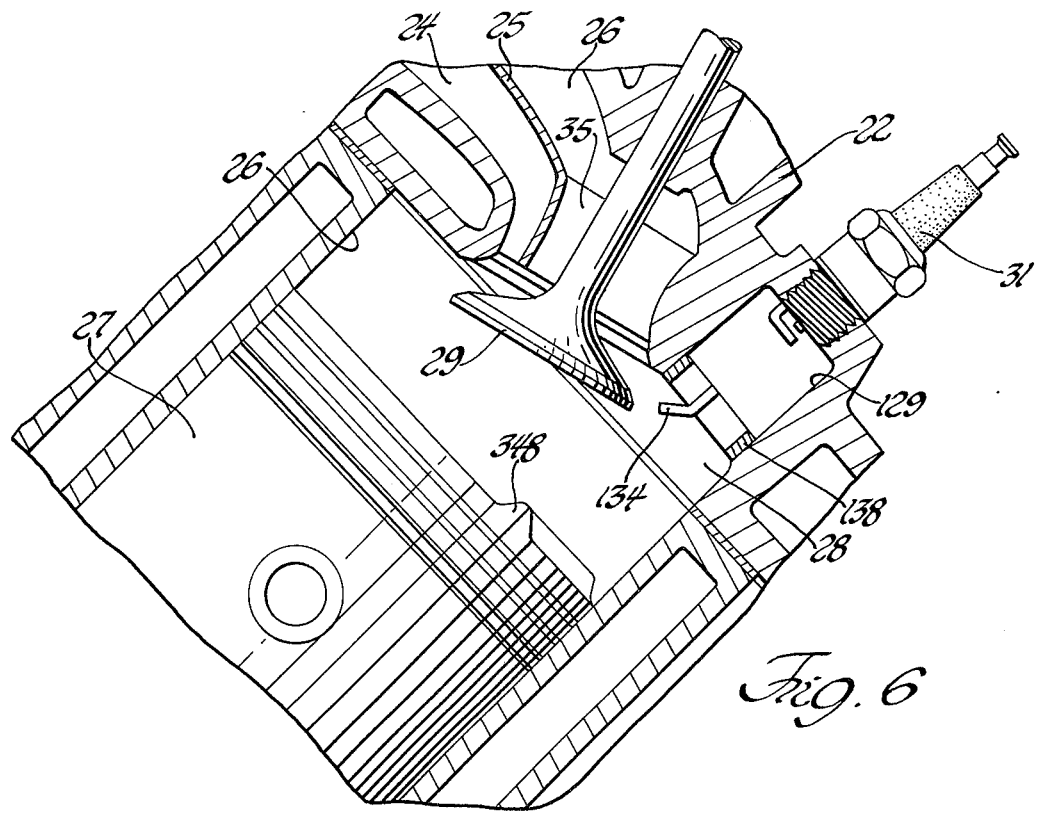
FIGS. 6 and 7 are views similar to FIG. 3, but showing different embodiments of the invention.

FIG. 6 shows a modified form which the segregation chamber may take where less heating of the spark ignitable mixture therein is required. In this modification the spark plug 31 is mounted directly in the cylinder head in an opening provided therefor in the upper end of the segregation chamber 129. The deflector member 134 and its supporting ring 138 are located in the lower end of the segregation chamber at the entrance thereto from the main combustion chamber, as in the previously described embodiment except that the ring member 138 is formed with a cylindrical external surface to enable it to be press fitted into the segregation chamber entrance. Thus the internal wall surfaces of the segregation chamber between the spark plug and the deflector ring are defined by the material of the cylinder head, and the increased heating of the spark ignitable mixture within the segregation chamber is limited to that which it receives in flowing into the segregation chamber past the ring 138 and deflector member 134.

Figures 7, 8:
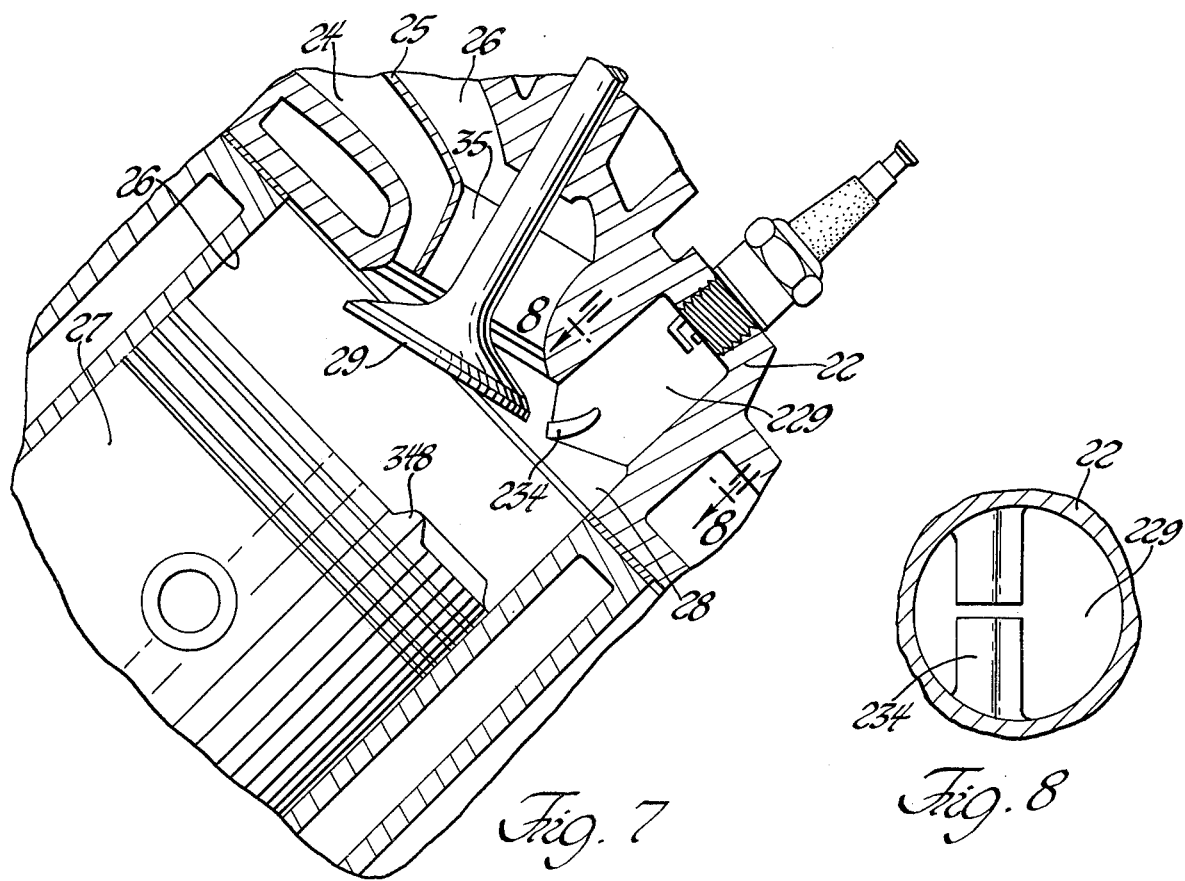
FIG. 8 is a fragmentary sectional view taken substantially on the line 8—8 of FIG. 7.

FIG. 7 illustrates a further modification wherein the separate ring and deflector member are dispensed with and a deflector member is employed which is formed integrally with the cylinder head casting. As in the previously described embodiments, this deflector member 234 extends across the entrance to the segregation chamber from the main combustion chamber 28. Although integral with the cylinder head it is of relatively thin section and thus operates to heat up faster and to retain its heat more than does the surrounding metal of the cylinder head, with the result that the spark ignitable mixture flowing thereover and into the segregation chamber aids ignition of the mixture by the spark plug and shortens engine warm-up time.

Figure 9:
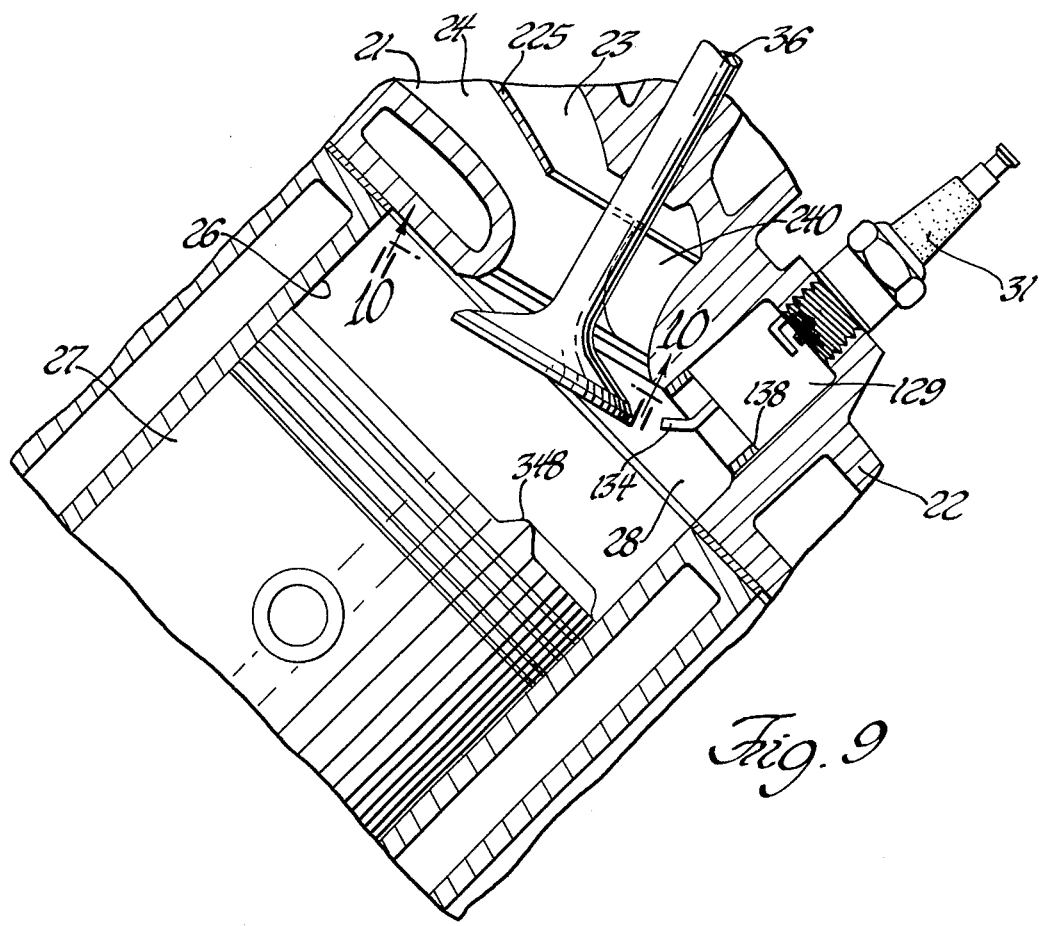
FIG. 9 is another view similar to FIG. 3, but showing a further modification of the invention.
Figure 10:
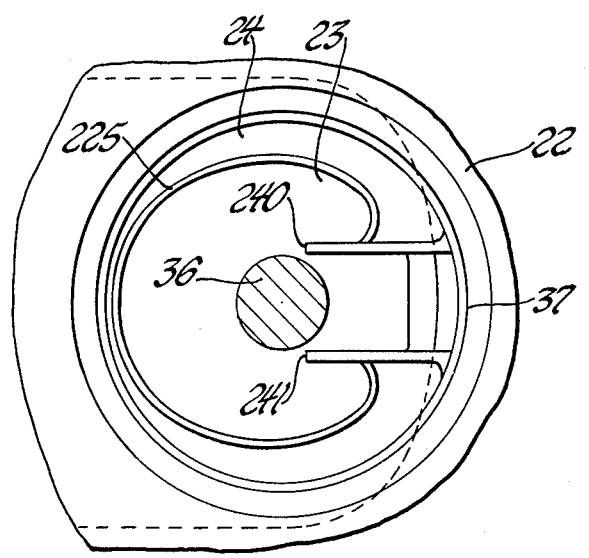
FIG. 10 is a fragmentary elevational view taken in the direction of the arrows 10—10 of FIG. 9, with parts broken away and in section.

FIGS. 9 and 10 show a further modification in which the segregation chamber 129, deflector member 134 and ring 138 are the same as in FIG. 6, but the partitioning means 225 in the cylinder head inlet passage 21 terminates adjacent the combustion chamber with spaced wall portions 240 and 241 to aid in better directing a substantial portion of the spark ignitable mixture toward the deflector member and thus into the segregation chamber. It will be noted that these wall portions 240 and 241 extend from adjacent the valve stem to the sidewall 37 of the inlet passage 21 adjacent the segregation chamber and thus serve to better channel the flow of spark ignitable mixture laterally toward the segregation chamber.

Figure 11:
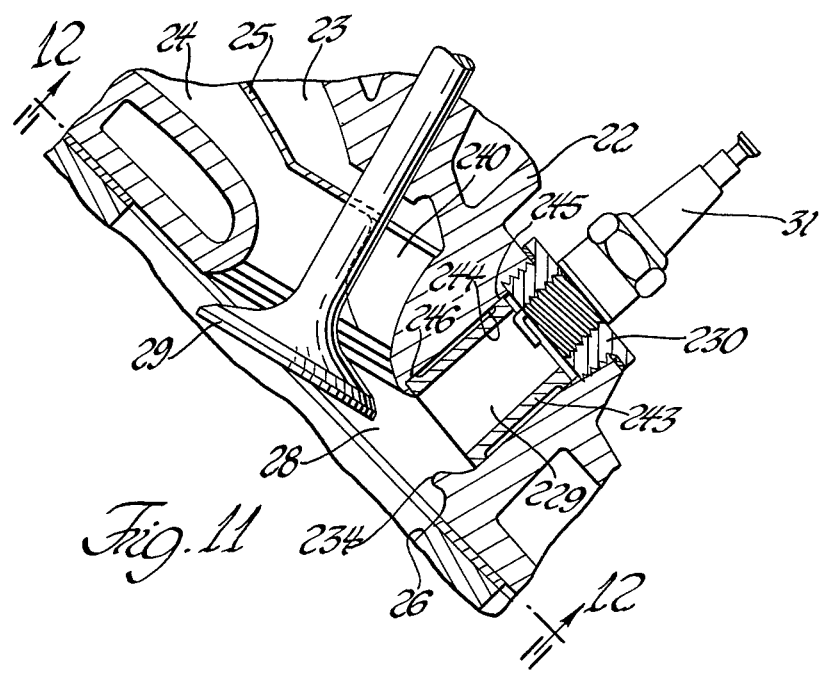
FIG. 11 is a fragmentary view similar to FIG. 3, but showing a still further modification of the invention.
Figure 12:
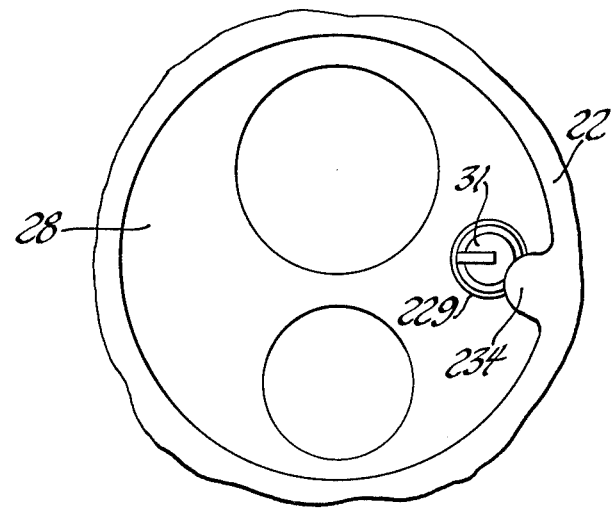
FIG. 12 is a fragmentary elevational view taken in the direction of the arrows 12—12 of FIG. 11.

In the modification of FIG. 11, the same partitioning means 225 with the spaced wall portions 240, 241 are employed as in the FIG. 9 embodiment, but the segregation chamber 229 is altered to provide for increased heating of the spark ignitable mixture therein and the provision for the deflector member 234 is simplified. The spark plug 31 is mounted in a bushing 230 in the cylinder head at the outer end of the segregation chamber, and extending between the spark plug and the entrance to the main combustion chamber 28 is a sleeve member 243 which is of relatively thin section and of material which is highly resistant to oxidation and attack by lead, sulphur and other elements in automobile fuels. Only the upper and lower ends 245, 246 of this sleeve member are normally in metal-to-metal contact with the surrounding metal of the cylinder head. Hence when the engine is not operating or is relatively cool as during initial warm-up, the outer peripheral surfaces of the sleeve member 243 between its ends 245, 246 are spaced a slight distance, i.e. in the order of a few thousandths of an inch, from the surrounding internal sidewalls 244 of the cylinder head. The thinness of the portion of the sleeve 243 between these ends and its clearance with the surrounding walls of the cylinder head are selected so that during engine warm-up such portion of the sleeve will gradually expand radially into metal-to-metal contact with the cylinder head. Until such contact occurs the rate of temperature rise of the sleeve member will be much greater than that of the cylinder head and consequently the heat imparted to the spark ignitable mixture within the segregation chamber 229 will be greatly augmented during engine warm-up. Also in this embodiment, the deflector member 234 is formed as an integral portion of the cylinder head but projects into the main combustion chamber 28 and toward the inlet valve from the side of the segregation chamber most remote from the valve. FIG. 12 shows that this deflector member 234, as viewed longitudinally of the cylinder, need have a width only approximately half that of the diameter of the segregation chamber, and is preferably offset laterally from the center of the segregation chamber to facilitate scavenging and refilling the latter with spark ignitable mixture during the suction stroke of the piston.

Figure 13:
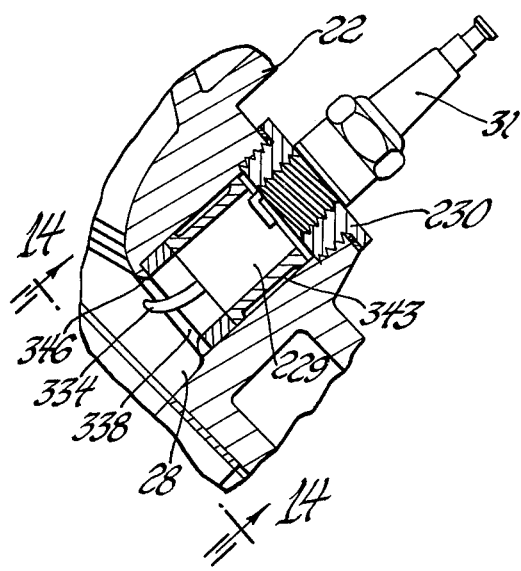
FIG. 13 is a fragmentary view similar to FIG. 3, but showing a still further modification of the invention.
Figure 14:
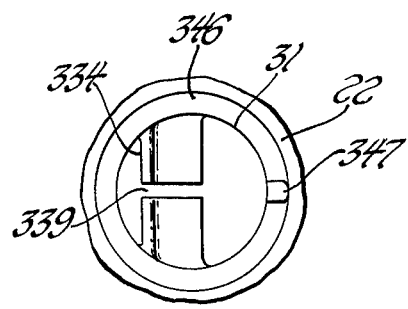
FIG. 14 is a fragmentary elevational view taken in the direction of the arrows 14—14 of FIG. 13.

FIGS. 13 and 14 show a modification of the invention in which the heating effect on the spark ignitable mixture within the segregation chamber is maximized since it employs both a thermally expansible liner plus a thermally expansible deflector supporting ring member therein. The sleeve member 343 is similar in all respects to the sleeve member 243 of FIG. 11, except being somewhat shorter than the latter to accommodate location of a thermally expansible ring member 338 which lines the entrance to the segregation chamber. The deflector member 334 is formed integrally with the ring member 338, as in the case of deflector members 34, 134 and ring members 38, 138 previously described. Under normal conditions, i.e., when the engine is cold or during initial engine warm-up, both the sleeve member 343 and the ring 338 have a slight clearance between them and the surrounding metal of the cylinder head, and as the temperature of the parts increases with continued engine operation, they expand into metal-to-metal contact with the cylinder head material, with the result that the rise in operating temperature of these parts decreases as additional heat is transmitted thereby to the cylinder head. A small internal flange 346 is provided in the cylinder head at the entrance to the segregation chamber to underly and retain the ring member against dropping into the main combustion chamber, and, as shown in FIG. 14, a projecting tab 347 is provided on the ring member for engagement in a recess in the flange 346 to ensure orientation of the ring member so that the deflector member 334 extends toward the intake valve. FIG. 14 also shows the slit or gap 339 in the deflector member which accommodates thermal expansion of the ring member during engine warm-up.

A further feature of the invention which may be used with each of the embodiments above described is the provision of a deflecting ridge on the piston 27. This ridge 348 projects upwardly toward the main combustion chamber 28 opposite the segregation chamber and serves during the compression stroke of the piston to retain a relatively rich mixture of spark ignitable mixture and air on that side of the cylinder for compaction in the segregation chamber against the spark ignitable mixture remaining therein at the end of the suction stroke. As the result, when the combustion of the spark ignitable mixture is initiated by the spark plug at the upper end of the segregation chamber the flame front thereupon developing continues progressively through this leaner but relatively rich mixture and thence outwardly into the main combustion chamber as a torchlike flame to receive additional combustion supporting air from the still leaner mixture within the main combustion chamber and thereby effect a nearly complete burning of the fuel charge.

The partitioning of the inlet passage so as to direct a substantial portion of the spark ignitable mixture toward the segregation chamber when the inlet valve opens, coupled with the effectiveness of the deflector member in redirecting such mixture upwardly of the combustion chamber, aids in scavenging and refilling the segregation chamber with spark ignitable mixture during the suction stroke of the piston. Also since the segregation chamber may extend generally longitudinally of the cylinder and still be adjacent the intake valve, it may be provided in the form of an enlargement and extension of the opening which has heretofore been used in the standard engine for mounting the spark plug. Relatively minor tooling changes are thus involved in modifying the cylinder head for operations as a segregated charge engine. Obviously the inlet passage partitioning may be either cast in place or inserted as a separate stamping or cast part. The deflector member, in addition to its function of directing the spark ignitable mixture into the segregation chamber, serves also to raise the temperature of such mixture in aiding and assuring its ignition by the spark plug. This heating effect may be greatly augmented, as desired, by the addition of the ring and sleeve members operating at higher temperature than the cylinder head. As shown and described, these members may either fixedly line the internal sidewalls of the segregation chamber, or have a slight clearance with the surrounding cylinder head surfaces to further accelerate the heating effect on the spark ignitable mixture during engine warm up.

Although the foregoing has proceeded in terms of particular embodiments, it is to be understood that various modifications and changes could be engrafted thereon by one skilled in the art within the spirit and scope of the appended claims.

The embodiments of the present invention in which an exclusive property or privilege is claimed are defined as follows:

1. In a spark ignition internal combustion engine having a power cylinder, a piston and a combustion chamber opposite the piston, an inlet valve openable into the combustion chamber toward the piston, an inlet passage communicating with the combustion chamber via the inlet valve, a fuel mixture segregation chamber adjacent the valve, said segregation chamber extending upwardly from the combustion chamber in a direction generally parallel with the longitudinal axis of the cylinder, said inlet passage having partitioning means therein defining a first passage sector for flow of spark ignitable fuel and air mixture into the portion of the combustion chamber nearest the segregation chamber during the suction stroke of the piston and a second passage sector for simultaneous flow of other gaseous fluid into the remainder of the combustion chamber, the combustion chamber end of the segregation chamber having a deflector member for directing said spark ignitable mixture into the segregation chamber, a portion of said deflector member extending toward the longitudinal axis of the cylinder, a deflecting ridge on the piston operative to maintain a relatively rich mixture of said ignitable mixture and said other gaseous fluid adjacent the side of the cylinder nearest the segregation chamber during the compression stroke of the piston, and a spark plug having electrodes extending into the segregation chamber for initiating combustion of said spark ignitable mixture therein.

2. The engine of claim 1, including a cylinder head defining the outward extremities of the combustion chamber opposite the piston, said cylinder head having an opening extending therethrough from the outer end of the segregation chamber, said opening being closed by the spark plug.

3. The engine of claim 2, wherein said deflector member is an integral part of the cylinder head and extends across the combustion chamber end of the segregation chamber.

4. The engine of claim 2, including a ring lining the combustion chamber end of the segregation chamber, said ring being of higher heat conductivity material than the material of the cylinder head, said deflector member extending across said ring and being an integral part thereof.

5. The engine of claim 1, including a cylinder head defining the outward extremities of the combustion chamber opposite the piston, said head having an opening extending therethrough from the combustion chamber in alignment with the segregation chamber, said deflector member extending across the combustion chamber end of said opening, and a bushing lining said opening and defining the side walls of the segregation chamber outwardly of the combustion chamber from said deflector member, said bushing being closed at its outer end by the spark plug and being of material having higher resistance at temperatures above 800° F. to oxidation attack by sulphur and lead fuel constituents than the material of the cylinder head.

6. The engine of claim 1, including a cylinder head defining the outward extremities of the combustion chamber opposite the piston, said cylinder head having an opening extending therethrough from the combustion chamber in alignment with the segregation chamber, a ring lining said opening adjacent the combustion chamber and defining the entrance therefrom to the segregation chamber, said deflector member extending across the ring and being an integral part thereof, and a bushing lining the opening and defining the side walls of the segregation chamber outwardly of the combustion chamber from said ring, said bushing being closed at its outer end by the spark plug, said ring deflector member and bushing being of a material having a higher thermal conductivity and resistance to oxidation attack by sulphur and lead fuel constituents than the material of the cylinder.

7. The engine of claim 1, wherein the inlet valve includes a valve stem and said partitioning means terminates adjacent the combustion chamber end of the inlet passage with spaced wall portions extending from adjacent the valve to the side of the inlet passage adjacent the segregation chamber.

8. The engine of claim 1, wherein the inlet valve includes a valve stem and said partitioning means terminates adjacent the combustion chamber end of the inlet passage with a generally C-shaped shroud portion having sidewalls surrounding the valve stem and extending on either side of the valve stem to the side of the inlet passage adjacent the segregation chamber.

9. The engine of claim 1, including a cylinder head defining the outward extremities of the combustion chamber opposite the piston, said cylinder head having an opening extending therethrough from the combustion chamber in alignment with the segregation chamber, the outer end of said opening being closed by the spark plug, said opening having cylindrical side walls, and a sleeve member in said opening defining the lateral extremities of the segregation chamber between the spark plug and the deflector, said sleeve member having its outer periphery adjacent its respective ends closely fitting the cylindrical side walls of the opening but normally spaced slightly from the cylindrical side walls of the opening intermediate said ends, said sleeve member being of material whose resistance to oxidation attack by sulphur and lead fuel constituents is substantially higher than that of the material of the cylinder head, whereby the temperature of said sleeve member increases more rapidly than the temperature of the cylinder head during engine operation and the outer periphery of the sleeve member expands into heat conducting contact with the side walls of said opening with increase in temperature of the sleeve member to reduce the rate of increase in temperature of the sleeve member relative to the increase in temperature of the cylinder head during engine operation.

10. The engine of claim 9, including a ring longitudinally interposed in said opening between said sleeve member and the combustion chamber, said deflector extending across said ring and being an integral part thereof, said ring having its outer periphery slightly spaced from the cylindrical side walls of the opening and being of material whose thermal conductivity and resistance to oxidation attack by sulphur and lead fuel constituents is substantially higher than that of the material of the cylinder head, whereby the temperature of said ring increases more rapidly than the temperature of the cylinder head during engine operation and the outer periphery of the ring expands into heat conducting contact with the cylinder walls of the opening with increase in temperature of the ring to reduce the rate of increase in temperature of the ring relative to that of the cylinder head engine during operation.

11. The engine of claim 9, wherein said deflector member is an integral part of the cylinder head and extends into the combustion chamber and toward the inlet valve from the side of the segregation chamber most remote from the inlet valve, and said segregation chamber having a depth extending from the combustion chamber to said electrodes of one-eighth to one-half the diameter of the cylinder and a volume less than 4 percent of the piston-swept volume of the cylinder.

12. In a spark ignition internal combustion engine having a power cylinder, a piston and a combustion chamber opposite the piston, an inlet valve openable into the combustion chamber opposite the piston for the admission of spark ignitable fuel and air mixture, a fuel mixture segregation chamber open at one end to the combustion chamber adjacent the valve, said segregation chamber extending upwardly from the combustion chamber in a direction generally parallel with the longitudinal axis of the cylinder and having a deflector member in its combustion chamber and for directing thereinto at least a substantial portion of said spark ignitable mixture admitted to combustion chamber by the valve, a portion of said deflector member extending toward the longitudinal axis of the cylinder, and a spark plug having electrodes extending into the segregation chamber for initiating combustion of said spark ignitable mixture therein, said segregation chamber having a depth extending from the combustion chamber to said electrodes of one-eighth to one-half the diameter of the cylinder and a volume less than 4 percent of the piston-swept volume of the cylinder.

13. The engine of claim 12, including a cylinder head defining the outward extremities of the combustion chamber opposite the piston, said cylinder head having an opening extending therethrough from the outer end of the segregation chamber, said opening being closed by the spark plug.

14. The engine of claim 13, wherein said deflector member is an integral part of the cylinder head and extends across the combustion chamber end of the segregation chamber.

15. The engine of claim 13, including a ring lining the combustion chamber end of the segregation chamber, said ring being of higher heat conductivity material than the material of the cylinder head, said deflector member extending across said ring and being an integral part thereof.

16. The engine of claim 12, including a cylinder head defining the outward extremities of the combustion chamber opposite the piston, said head having an opening extending therethrough from the combustion chamber in alignment with the segregation chamber, said deflector member extending across the combustion chamber end of said opening, and a bushing lining said opening and defining the side walls of the segregation chamber outwardly of the combustion chamber from said deflector member, said bushing being closed at its outer end by the spark plug and being of material having higher resistance to oxidation attack by sulphur and lead fuel constituents than the material of the cylinder head.

17. The engine of claim 12, including a cylinder head defining the outward extremities of the combustion chamber opposite the piston, said cylinder head having an opening extending therethrough from the combustion chamber in alignment with the segregation chamber, a ring lining said opening adjacent the combustion chamber and defining the entrance therefrom to the segregation chamber, said deflector member extending across the ring and being an integral part thereof, and a bushing lining the opening and defining the side walls of the segregation chamber outwardly of the combustion chamber from said ring, said bushing being closed at its outer end by the spark plug, said ring deflector member and bushing being of a material having a higher thermal conductivity and resistance to oxidation attack by sulphur and lead fuel constituents than the material of the cylinder.

18. The engine of claim 12, including a cylinder head defining the outward extremities of the combustion chamber opposite the piston, said cylinder head having an opening extending therethrough from the combustion chamber in alignment with the segregation chamber, the outer end of said opening being closed by the spark plug, said opening having cylindrical side walls, and a sleeve member in said opening defining the lateral extremities of the segregation chamber between the spark plug and the deflector, said sleeve member having its outer periphery adjacent its respective ends closely fitting the cylindrical side walls of the opening but normally spaced slightly from the cylindrical side walls of the opening intermediate said ends, said sleeve member being of material whose resistance to oxidation attack by sulphur and lead fuel constituents is substantially higher than that of the material of the cylinder head, whereby the temperature of said sleeve member increases more rapidly than the temperature of the cylinder head during engine operation and the outer periphery of the sleeve member expands into heat conducting contact with the side walls of said opening with increase in temperature of the sleeve member to reduce the rate of increase in temperature of the sleeve member relative to the increase in temperature of the cylinder head during engine operation.

19. The engine of claim 18, including a ring longitudinally interposed in said opening between said sleeve member and the combustion chamber, said deflector extending across said ring and being an integral part thereof, said ring having its outer periphery slightly spaced from the cylindrical side walls of the opening and being of material whose thermal conductivity and resistance to oxidation attack by sulphur and lead fuel constituents are substantially higher than that of the material of the cylinder head, whereby the temperature of said ring increases more rapidly than the temperature of the cylinder head during engine operation and the outer periphery of the ring expands into heat conducting contact with the cylinder walls of the opening with increase in temperature of the ring to reduce the rate of increase in temperature of the ring relative to that of the cylinder head engine during operation.

20. The engine of claim 18, wherein said deflector member is an integral part of the cylinder head and extends into the combustion chamber and toward the inlet valve from the side of the segregation chamber most remote from the inlet valve.

* * * * *